Oct. 30, 1934.            H. G. HANCOCK            1,979,069
                          CHAIN REPAIR LINK
                         Filed Dec. 14, 1933
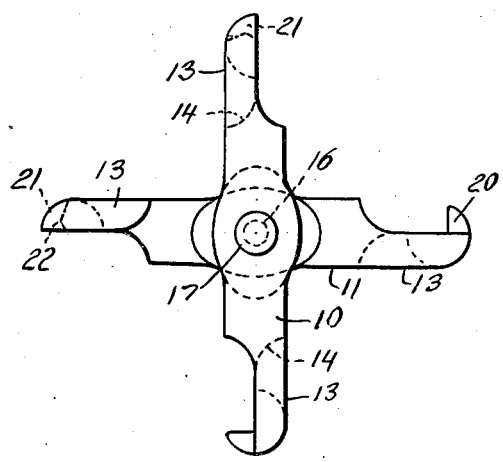
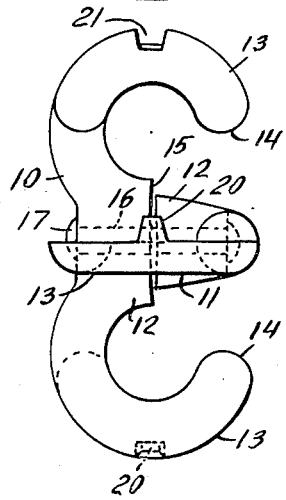
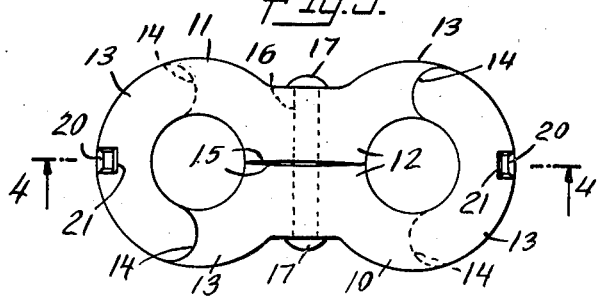
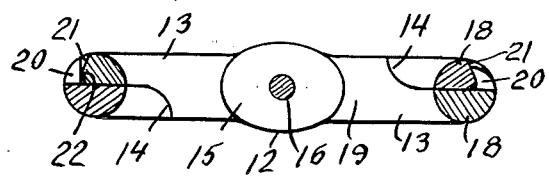
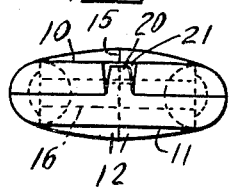
INVENTOR
Horace G. Hancock
BY
Pennie, Davis, Marvin Edmonds
ATTORNEYS Patented Oct. 30, 1934

1,979,069

UNITED STATES PATENT OFFICE 1,979,069

CHAIN REPAIR LINK

Horace G. Hancock, New Haven, Conn., assignor to Krischer's Manufacturing Company, Brooklyn, N. Y., a corporation of New York Application December 14, 1933, Serial No. 702,326

3 Claims. (Cl. 59—88)

This invention relates to links for repairing or connecting together lengths of chain and is concerned more particularly with a chain repair link of novel construction which can be easily employed for the desired purpose and can be manufactured at low cost.

Chain repair links of various forms have been devised heretofore, some of these links being of deformable material so that they must be closed by hammering after installation, while others have freely moving parts so that they can be readily opened and closed. Links of the first type are subject to the objection that they must be closed by the application of force and frequently they have to be installed in places where it is difficult to hammer them shut. Also, since they are made of deformable material, they are liable to open in service and be lost out of the chain.

Links of the second type, as heretofore constructed, are objectionable in that, although they may be easily installed, they are also liable to open when in use and this may either result in their being lost or cause portions of them to project out of the chain in such a way as to interfere with its use.

The present invention is accordingly directed to the provision of a chain repair link of novel construction which overcomes the objections of the prior devices. The new link comprises a pair of members pivoted together and each having hooks at its ends and when the members are in one position on the pivot, the corresponding hooks on the two members are separated so that one hook on each member may be passed through a link of each length of chain to be connected. The members may then be moved to another position in which the corresponding hooks on the members lie in overlapped position and each pair of overlapped hooks forms a ring connected to a chain link. The members are further provided with means for securing their hooks in overlapped position so that they cannot separate, and these means preferably include a deformable element on one overlapped hook receivable in a recess in the other. Deformation of the two elements can be readily effected to secure the two hook members in proper closed position and thereafter accidental opening of the repair link is prevented.

The securing means referred to are preferably used at both ends of the repair link and the cost of the device can be reduced by making it of two identical members. Each member is then formed with a deformable element on the hook at one end and a recess in the hook at the other, the members being assembled in such manner that the element on one member cooperates with the recess on the other. The members so constructed can be made by casting operations at low cost.

For a better understanding of the invention, reference may be made to the accompanying drawing showing one form of the new repair link. In the drawing, Figure 1 is a plan view of the new repair link with the two members open;

Figure 2 is a side view of the link with the members in open position;

Figure 3 is a face view of the link with the members closed;

Figure 4 is a sectional view on the line 4—4 of Figure 3, and

Figure 5 is an end view of the link with the members closed.

Referring to the drawing, the new repair link is illustrated as being made up of a pair of members 10, 11 which may be identical. Each member includes a central section 12 which terminates in hooks 13, the free ends 14 of which lie at the same side of the central section. On this side of the section and lying between the hooks is a bearing surface 15.

The two members are secured together, with their bearing surfaces opposed, by means of a pivot pin 16, having its ends 17 enlarged so as to prevent removal of the members. The latter are mounted on the pin with the hooks on each member extending toward the other and the members may be swung together on the pivot so that the hooks on one member overlap those on the other.

The overlapping portions 18 of the hooks have a sectional form different from that of the other parts of the hooks, so that the overlapping portions of two hooks may have about the same sectional size as that of the non-overlapping part of a single hook. In the construction shown, that part 19 of each hook adjacent its junction with the central section is of round section, while the overlapping end portion is half-round. When the end portions of corresponding hooks are overlapping, their flat surfaces lie in contact and these portions cooperate to produce a pair of rings at the ends of the repair link, each ring being of round section.

In order that the hooks of the two members may be held in overlapping relation, fastening means are provided and these means preferably take the form of a projection 20 on one hook which is receivable in a recess 21 in the cooperating hook. This projection is integral with the hook and it is of thin metal so that it may be deformed. In the bottom of the recess, I provide a ridge 22 over which the projection may be bent and when the projection has thus been deformed, it cooperates with the ridge to hold the two members of the repair link with the flat faces of their hooks in contact. Preferably, there are a projection and recess at each end of the link and the two members are identical, each having a projection at one end and a recess at the other.

As a further means for securing the members in closed position, the bearing surfaces 15 on the members are so made as to force the members apart and against the heads of the pin, when the members are swung to closed position. For this purpose, each surface may be made slightly concaved from end to end when the members lie parallel, the ends of the two surfaces engage and force the members apart. This causes the members to engage the heads of the pivot sufficiently tightly to offer some resistance to a swinging movement of the members toward open position and thus assists the securing means in performing their functions.

The new link is preferably made of a metal, such as bronze, by a casting operation, and by making the members identical, the cost of manufacture is greatly reduced. Little or no machining is required to produce the members with a projection and recess, and when bronze is used, the projections may be readily deformed without danger of breakage.

What I claim:

1. A chain repair link which comprises a pair of members, each of which is made up of a central section provided with a bearing surface on one side and a hook at each end of said section with the free ends of both hooks projecting beyond said side of the central section, a pivot passing through said sections and through said surfaces, said pivot having enlarged ends securing said members together and said surfaces being formed to force said members into tight engagement with said enlarged ends when said members occupy a position in which the hooks on one member overlap the hooks on the other, and means on said hooks for securing them in overlapped position.

2. A chain repair link which comprises a pair of identical members secured together for pivotal movement, each member being made up of a central section with a hook at each end, the free ends of the hooks lying at the same side of the member, a bendable element extending outwardly from one hook at one end of said member and a recess formed in the other hook at the other end of said member, said recess having a ridge in the bottom thereof, said members being mounted on the pivot with the hooks of one member projecting toward the other member, said hooks being formed to lie in overlapped relation when the members are swung in the proper direction on the pivot with the bendable element on one member receivable in the recess on the other member and operable on being bent over said ridge to secure said hooks in overlapped position.

3. A chain repair link which comprises a pair of members each of which is made up of a central section provided with a bearing surface on one side and a hook at each end of said section with the free ends of both hooks projecting beyond said side of the central section, a deformable element extending from one hook and a recess formed in the other hook, a pivot passing through said sections and through said surfaces, said pivot having enlarged ends securing said members together and said surfaces being formed to force said members into tight engagement with said enlarged ends when said members occupy a position in which the hooks of one member overlap the hooks on the other, the deformable element of one member being receivable in the recess on the other member and operable on deformation to secure said hooks in overlapped position.

HORACE G. HANCOCK.